June 16, 1925.
C. M. EBERLING
BATTERY TERMINAL CONNECTER
Filed July 17, 1922
1,542,680
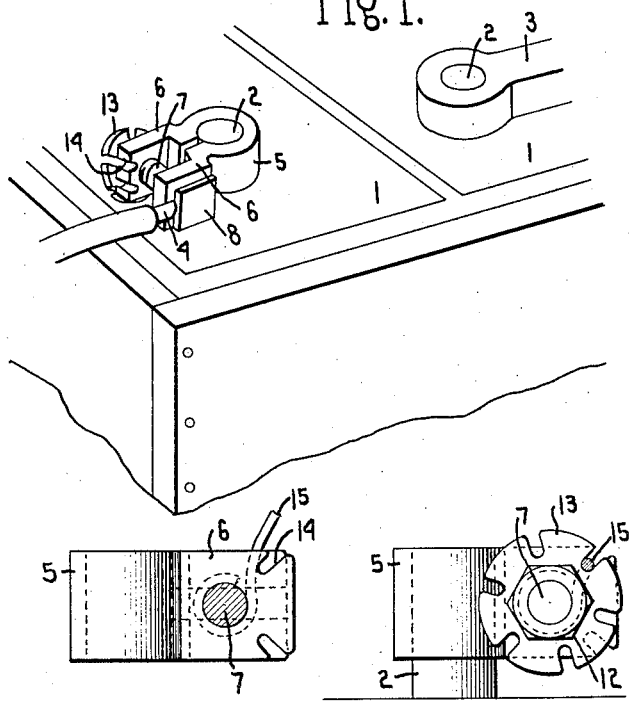
Fig.1.
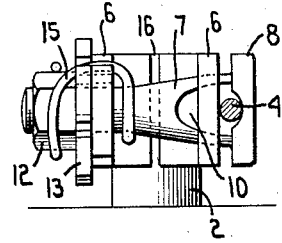
Fig.2.
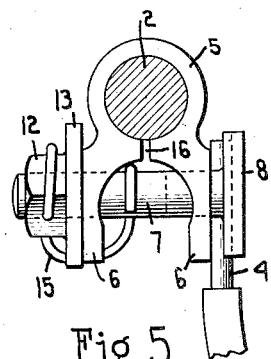
Fig.5.
Fig.3.  Fig.4.
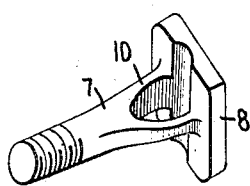
Fig.6.
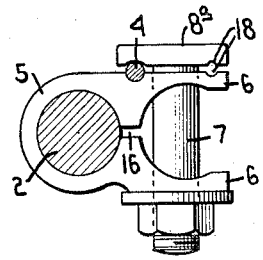
Fig.7.
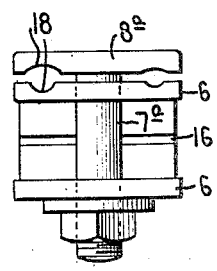
Fig.8.
Charles M. Eberling
INVENTOR.
BY
ATTORNEY.

Patented June 16, 1925.

1,542,680

UNITED STATES PATENT OFFICE.

CHARLES M. EBERLING, OF CLEVELAND, OHIO.

BATTERY TERMINAL CONNECTER.

Application filed July 17, 1922. Serial No. 575,703.

*To all of whom it may concern:*

Be it known that I, CHARLES M. EBERLING, a citizen of the United States, residing at Cleveland, in the county of Cuyahoga and State of Ohio, have invented a certain new and useful Improvement in Battery Terminal Connecters, of which the following is a full, clear, and exact description, reference being had to the accompanying drawings.

This invention relates to storage batteries and has for its object the provision of a cheap, simple, reliable, and universal wire-connecter therefor. Such storage batteries are used in great numbers for the starting and lighting of vehicles and for the operation of radio-telephone systems. Each battery usually consists of a jar with active plates therein terminating in a plain upstanding post to which the wire must be attached. These posts differ very little in size and shape but the cables which are attached thereto vary with every make of automobile and are still different in the case of radio apparatus. Hitherto the most successful terminals are those designed to be soldered to the cables yet this is impossible for the individual owner to accomplish and constitutes a very objectionable step in the large scale factory production of cars. I have devised a connecter which grips the cable and terminal securely regardless of the size of the cable and can be applied more quickly than the soldered joint; which I believe is cheaper to make than any similar device now in use; which holds the parts more firmly and with better contact than other devices; which can be reused indefinitely; which can be applied and removed with the common kit-tools; and which can readily be fastened against accidental loosening.

In the drawings accompanying and forming a part of this application I have shown certain illustrative embodiments of my invention. Fig. 1 is a perspective view of a battery equipped with one of my improved terminals; Figs. 2, 3, 4, and 5 are different elevations of the terminal; Fig. 6 is a perspective view of the preferred type of bolt employed therewith; and Figs. 7 and 8 are views of modifications.

Describing the parts by reference characters, 1, 1 represent battery cells having terminal posts 2, 2 to which are attached the active plates, not shown. These posts are generally made of lead and are nearly cylindrical except for a slight taper which is usually given them. The posts of adjacent cells are joined together by massive lead connecters 3, and flexible insulated cables 4 are attached to the end posts.

My improved connecter comprises a split collar 5 adapted to fit the terminal post 2 and having a pair of projecting ears 6, 6 apertured for the clamping bolt 7 which is arranged to receive the wire 4 beneath its head 8. The shank of the bolt is preferably made oval in cross section and received in an oval hole in one of the ears so as to be proof against rotation, while itself being formed with an oblong transverse aperture 10 for the reception of the wire. In this way I produce a device which will receive and hold with good electric contact any conductor from ¼ inch diameter downward and even as high as twelve No. 18 wires which is the largest used in automobile practice. In order to prevent accidental loosening of the bolt I prefer to form the nut 12 with a notched flange 13 adapted to register with one or more notches 14 in the adjacent ear and thus enable the reception of a lead wire 15.

The device is preferably made of bronze composition by casting in permanent molds, after which the collar 5 is reamed the scarf 16 formed with a saw and the whole platted or coated with lead or other acid resistant substance. The holes for the bolt as well as the hole 10 in the bolt are best cast therein, as are also the notches in the nut and ears when same are employed.

In all cases the same pressure which closes the collar on the post also tightens the wire while at the same time producing the largest possible area of contact between each member and the attached member. The employment of an apertured bolt has the advantage of clamping the different strands of a cable together when a stranded conductor is employed and the oblong shape of the hole enables the attachment of a large cable without unduly increasing the size of the bolt. However I do not restrict myself in all cases to an apertured bolt as in some cases it is sufficient to form the head 8ᵃ of the bolt and the face of the adjacent ear 6 with notches 18 which may be of the same or different sizes and either parallel or perpendicular to the axis of the collar. It is best to have the notches or aperture, whichever is used, perpendicular to the post 2 since the wire is generally horizontal and any other arrangement involves bending the wire. It will be understood, therefore, that I do not limit myself to the constructions and designs shown and described nor in another way except as specifically recited in the annexed claims.

Having thus described my invention what I claim is:

1. A terminal connecter adapted for use with a storage battery terminal post and comprising a split collar adapted to surround said post and provided with a pair of ears one on each side of the split in said collar and each apertured, a bolt comprising a head arranged to overlie one of said ears and a shank arranged to pass through said apertures and itself transversely apertured adjacent said head to permit insertion of a wire through said shank between said head and the adjacent ear, and a nut arranged to screw-threadedly engage said shank beyond said ears and, in coaction with said bolt, to simultaneously clamp said collar to said post and said wire in position.

2. A terminal connecter adapted for use with a storage battery terminal post and comprising a split collar adapted to surround said post and provided on one side of the split in said collar with a first apertured ear and on the other side of said collar with a second apertured ear containing a non-circular aperture, a bolt comprising a head arranged to overlie said second ear and a shank arranged to pass through said apertures and provided with a non-circular part arranged to cooperate with said non-circular aperture to prevent rotation of said bolt when said bolt is in position and with an aperture extending through said shank adjacent said head to permit insertion of a wire through said shank between said head and said second ear, and a nut arranged to screw-threadedly engage said shank beyond said first ear and, in coaction with said bolt, to simultaneously clamp said collar to said post, hold said bolt in a position wherein rotation thereof is prevented, and clamp said wire to said collar.

In testimony whereof, I hereunto affix my signature.

CHARLES M. EBERLING.